(12) United States Patent
Chatwin et al.

(10) Patent No.: US 8,527,352 B2
(45) Date of Patent: Sep. 3, 2013

(54) SYSTEM AND METHOD FOR GENERATING OPTIMIZED BIDS FOR ADVERTISEMENT KEYWORDS

(75) Inventors: Richard Edward Chatwin, Sunnyvale, CA (US); Ayman Omar Farahat, San Francisco, CA (US); Matthew Robert McEachen, El Granada, CA (US)

(73) Assignee: Adchemy, Inc., Palo Alto, CA (US)

( * ) Notice: Subject to any disclaimer, the term of this patent is extended or adjusted under 35 U.S.C. 154(b) by 1729 days.

(21) Appl. No.: 11/590,043

(22) Filed: Oct. 30, 2006

(65) Prior Publication Data

US 2008/0103892 A1    May 1, 2008

(51) Int. Cl.
    *G06Q 30/00*    (2012.01)
(52) U.S. Cl.
    USPC .......... 705/14.71; 705/14.41; 705/14.45; 705/14.46; 705/14.69; 705/14.73
(58) Field of Classification Search
    USPC .......... 705/1–30, 14.71; 709/100–250; 707/1–50
    See application file for complete search history.

(56) References Cited

U.S. PATENT DOCUMENTS

| | | | |
|---|---|---|---|
| 6,606,608 B1 | 8/2003 | Bezos et al. | |
| 6,907,566 B1 | 6/2005 | McElfresh et al. | |
| 2002/0099605 A1* | 7/2002 | Weitzman et al. | 705/14 |
| 2005/0097204 A1 | 5/2005 | Horowitz et al. | |
| 2005/0144064 A1 | 6/2005 | Calabria et al. | |
| 2005/0149396 A1* | 7/2005 | Horowitz et al. | 705/14 |
| 2006/0068372 A1* | 3/2006 | Jones, III | 435/4 |
| 2006/0282328 A1 | 12/2006 | Gerace et al. | |
| 2007/0100795 A1* | 5/2007 | Davies | 707/3 |
| 2008/0010144 A1 | 1/2008 | Chatwin et al. | |

OTHER PUBLICATIONS

Jyrki Kivinen and Manfred Warmuth, "Exponentiated Gradient Versus Gradient Descent for Linear Predictors", Jun. 21, 1994, revisded Dec. 7, 1995, Computer Engineering & Information Sciences, Univ. of California, Santa Cruz, CA 95064.*
USPTO, *Non-Final Office Action*, U.S. Appl. No. 11/477,194, filed Jun. 27, 2006, in re: Chatwin et al.; (28 pgs), dated Feb. 26, 2009.
USPTO, *Final Office Action*, U.S. Appl. No. 11/477,194, filed Jun. 27, 2006, in re: Chatwin et al.; (40 pgs), dated Aug. 6, 2009.

* cited by examiner

*Primary Examiner* — Sun Li
(74) *Attorney, Agent, or Firm* — Baker Botts L.L.P.

(57) ABSTRACT

The present invention is directed towards systems and method for generating a bid amount for one or more keywords for a display of an advertisement associated with a given keyword. The method comprises calculating estimates of one or more advertising metrics for one or more keywords associated with one or more advertisements displayed at one or more positions. Target positions are identified for the one or more keywords at which a return on investment earned by the display of one or more advertisements in response to a query that matches a given keyword exceeds a threshold by a given probability on the basis of the estimates to select a given target position that provides a greatest estimated profit. Bid amounts are generated for the one or more keywords in order to obtain the display of associated advertisements at the given target position.

63 Claims, 5 Drawing Sheets

SYSTEM AND METHOD FOR GENERATING OPTIMIZED BIDS FOR ADVERTISEMENT KEYWORDS

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The invention disclosed herein relates generally to systems and methods for optimizing the generation of bids for keywords. More specifically, the present invention relates to generating bids for one or more keywords associated with one or more advertisements.

BACKGROUND OF THE INVENTION

Advertisements are commonly used on the Internet to promote various products and services. Advertisements may comprise banner advertisements, links to web pages, images, video, text, etc. The various advertisements used to promote products on the Internet may be displayed according to a variety of formats, such as in conjunction with a ranked result set in response to a query, embedded in a web page, a pop-up, etc. The advertisements displayed to a user of a client device may be selected, redirecting the user to a website providing the product or service advertised.

Client devices, communicatively coupled to a network such as the Internet, are capable of searching for content, such as web pages, documents, etc., using one or more queries comprising one or more keywords as input to a search engine. The one or more keywords comprising the queries with which users search for content items may be used to retrieve one or more advertisements associated with the one or more keywords.

Advertisers may bid on the one or more keywords, including groups of related keywords. A search engine may utilize the bids associated with the one or more keywords to select one or more advertisements for distribution to client devices. Advertisers participating in such an auction-based keyword bidding system may face the daunting challenge of managing and optimizing the ongoing bid process, for example, managing and optimizing bids for thousands or millions of keywords or groups of keywords associated with one or more advertisements.

In order to overcome shortcomings associated with existing advertisement bid management techniques, embodiments of the present invention provide systems and methods for generating bid amounts that result in the greatest profit for one or more keywords associated with one or more advertisements.

SUMMARY OF THE INVENTION

The present invention is directed towards systems and methods for generating a bid amount for one or more keywords for a display of an advertisement associated with a given keyword. The method comprises calculating one or more estimates for metrics associated with the one or more keywords comprising one or more keyword groups. According to one embodiment, a method in accordance with the present invention comprises calculating one or more estimates of a click-to-action conversion rate for one or more keywords comprising one or more keyword groups displayed at one or more positions For example, the method may comprise calculating one or more estimates of a impression-to-click rate for the one or more keywords comprising the one or more keyword groups displayed at the one or more positions, calculating one or more estimates of a bid amount for the one or more keywords comprising one or more keyword groups to display one or more advertisements in response to the one or more keywords at the one or more positions and calculating one or more estimates of a cost for a user selection of an advertisement displayed at the one or more positions in response to the one or more keywords.

Target positions are identified for the one or more keywords at which a return on investment earned by the display of one or more advertisements in response to a query that matches a given one of the one or more keywords exceeds a threshold by a given probability on the basis of the estimates to select a given target position that provides a greatest estimated profit. Bid amounts are generated for the one or more keywords in order to obtain the display of associated advertisements at the given target position in response to a query that matches a given one of the one or more keywords. It should be noted by those of skill in the art that the techniques described herein may be readily applied to applications beyond the placement of advertisements with search results, such as placement of advertisements on content pages (e.g., blogs).

According to embodiments of the invention, a keyword group comprises one or more keywords. Still further, embodiments of the invention contemplate that every keyword is part of a keyword group and a given keyword group comprises at least one keyword. A given keyword group, one or more keywords in a given keyword group or one or more keywords from a plurality of keyword groups may be associated with one or more items of metric data. Metric data associated with a given keyword may comprise data identifying a frequency with which one or more advertisements associated with a given keyword were displayed to one or more users. Metric data associated with a given keyword may also comprise data identifying a frequency with which one or more advertisements associated with a keyword were selected by one or more users. Metric data associated with a given keyword may further comprise other events, for example, data identifying a frequency with which a user performed one or more actions with respect to a web page corresponding to an advertisement associated with a given keyword. Similarly, metric data associated with a given keyword may comprise data identifying a cost associated with the display of one or more advertisements associated with a keyword and data identifying a bid associated with the display of one or more advertisements associated with a keyword.

In addition to the foregoing, metric data associated with a given keyword may comprise one or more non-keyword attributes associated with a given keyword. A given non-keyword attribute may be selected form the set of non-keyword attributes consisting of a given day of week, a given time of day and a recent query history for a given user. Metric data associated with a given keyword may also comprise one or more keyword attributes associated with a given keyword. A given keyword attribute may be selected from the set of keyword attributes consisting of a presence of one or more stop words and a number of terms included in a query. A given keyword may be associated with various combinations of one or more keyword attributes and one or more non-keyword attributes.

One or more given keywords may be organized according to a keyword group or groups. A keyword group may comprise one or more keywords with similar expected performance with regard to one or more items of metric data. According to one embodiment, keywords with similar expected performance include one or more keywords associated with one or more advertisements displayed during a given time period, one or more keywords associated with one or more advertisements displayed at a given position within an ordered list of advertisements and one or more keywords associated with a given category.

As discussed above, one or more metric estimates are generated for one or more keyword groups. According to one embodiment calculating one or more metric estimates for one or more keyword groups comprises performing an analysis upon one or more items of metric data associated with the one or more keywords comprising one or more keyword clusters to generate one or more metric estimates for the keyword clusters. One or more metric estimates are generated for the one or more keywords comprising one or more keyword groups through use of an estimation procedure that incorporates mean metric estimates for the keyword clusters. One or more advertising metric estimates associated with an interesting keyword group from among the one or more keyword groups are refined through the use of generated estimates associated with the interesting keyword group.

According to one embodiment of the present method, the metric is selected from the group consisting of a click-to-action conversion rate and an impression-to-click rate. Performing an analysis may comprise estimating the parameters of a generalized linear model, which may comprise a logistic regression model. The step of generating metric estimates may comprise estimating the parameters of a penalized generalized linear model, which may include a logistic ridge regression model and the penalty factors of a penalized generalized linear model may be estimated through cross-validation. Estimating the parameters of a penalized generalized linear model may be approximated through a gradient descent algorithm, which may include the penalty factors of a gradient descent approximation to a penalized generalized linear model being estimated through cross-validation.

In addition to the foregoing, the metric may be selected from the group consisting of a bid, a cost and a bid cost delta. Performing an analysis may comprise estimating the parameters of a generalized linear model, for example, through the use of a standard ordinary least squares regression model. According to one embodiment, the generalized linear model comprises a standard ordinary least squares regression model in which the response variable is the natural logarithm of the observed bid. Alternatively, the generalized linear model comprises a generalized linear model with Normal random component and logarithmic link function. Still further, the generalized linear model may comprise a generalized linear model with Gamma random component and logarithmic link function.

As discussed above, keywords and keyword groups may be organized in accordance with one or more keyword clusters; a given keyword cluster comprising one or more keywords. According to one embodiment, a given keyword group is contained in a single keyword cluster. Alternatively, a given keyword group may be contained in multiple keyword clusters.

In addition to the foregoing embodiments, the present invention is directed towards a method for generating a bid amount for one or more keywords for a display of an advertisement associated with a given keyword that comprises calculating estimates of one or more advertising metrics for one or more keywords associated with one or more advertisements displayed at one or more positions and identifying target positions for the one or more keywords at which a return on investment earned by the display of one or more advertisements in response to a query that matches a given one of the one or more keywords exceeds a threshold by a given probability on the basis of the estimates to select a given target position that provides a greatest estimated profit. Bid amounts are generated for the one or more keywords in order to obtain the display of associated advertisements at the given target position in response to a query that matches a given one of the one or more keywords.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF PREFERRED EMBODIMENTS

In the following description, reference is made to the accompanying drawings that form a part hereof, and in which is shown by way of illustration specific embodiments in which the invention may be practiced. It is to be understood that other embodiments may be utilized and structural changes may be made without departing from the scope of the present invention.

Figure 1:
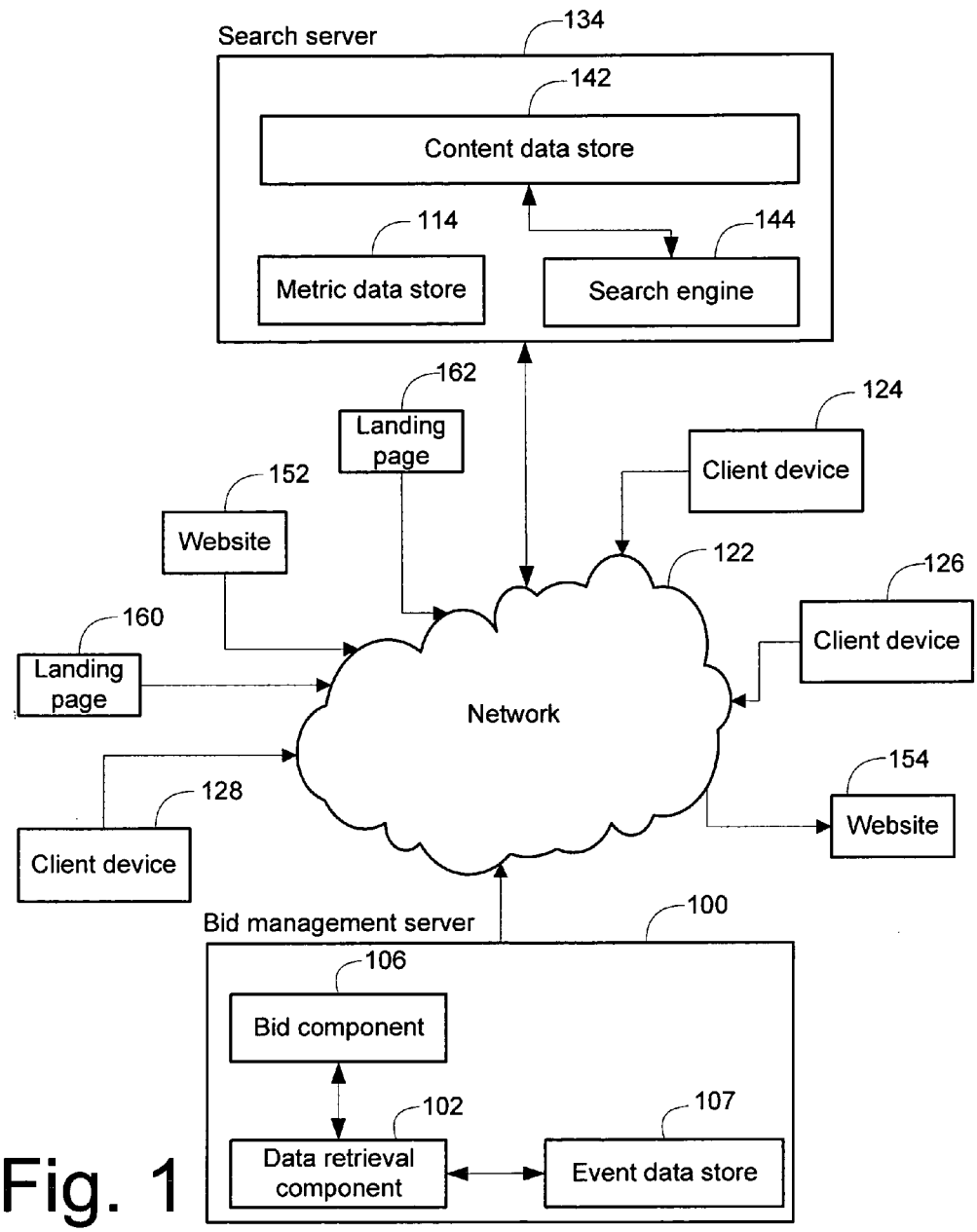
FIG. 1 is a block diagram presenting a system for generating bids for one or more keywords associated with one or more advertisements according to one embodiment of the present invention.

FIG. 1 presents a block diagram depicting one embodiment of a system for generating a bid amount for one or more keywords for a display of an advertisement associated with a given keyword. According to the embodiment illustrated in FIG. 1, client devices 124, 126 and 128 are communicatively coupled to a network 122, which may include a connection to one or more local or wide area networks, such as the Internet. According to one embodiment of the invention, a client device 124, 126 and 128 is a general-purpose personal computer comprising a processor, transient and persistent storage devices, input/output subsystem and bus to provide a communications path between components comprising the general-purpose personal computer. For example, a 3.5 GHz Pentium 4 personal computer with 512 MB of RAM, 40 GB of hard drive storage space and an Ethernet interface to a network. Other client devices are considered to fall within the scope of the present invention including, but not limited to, hand held devices, set top terminals, mobile handsets, PDAs, etc.

A user of a client device 124, 126, and 128 communicatively coupled to the network 122 may transmit a search query comprising one or more terms to a search server 134. An search sever 134 may comprise a search provider, such as Yahoo!™, Google!™, MSN!™, AOL!™, etc., operative to receive one or more search queries comprising one or more terms from one or more client devices 124, 126, and 128. For example, an search server 134 may provide users of client devices 124, 126, and 128 with the ability to conduct searches via a search engine 144 at a given search server 134 using search queries comprising one or more terms.

As discussed herein, a query received from a user of a client device 124, 126, and 128 may comprise one or more terms. For example, the query "wireless notebook computer" contains three terms and may be referred to as a three-term query. Similarly, queries containing only one term are referred to as one-term queries, queries containing two terms are two-term queries, etc. A space or other delimiter character may be used to identify the individual terms comprising a given query.

Upon receiving a given search query comprising one or more terms, a search server 134 may utilize a search engine 144 to execute a search of one or more content data stores 142 for one or more keywords and corresponding advertisements responsive to the one or more terms. A content data store 142 may be operative to maintain one or more keywords associated with one or more advertisements and may comprise one or more accessible memory structures such as a database, CD-ROM, tape, digital storage library, etc. A content data store 142 may be implemented as a relational database or any other type of storage structure capable of providing for the retrieval and storage of a variety of disparate data types.

According to one embodiment of the invention, the keywords maintained in the content data store 142 are further associated with one or more advertisements. The search server 134 may utilize the one or more keywords associated with one or advertisements to identify advertisements responsive to a given query received from a client device 124, 126, and 128. For example, the advertisement server 134 may receive a given query from a user of a client device 124, 126, and 128 comprising two terms. The advertisement server 134 may search the content data store 142 to identify one or more keywords that match or are similar to the one or more search terms forming the query received from the respective user. Matching of keywords may be accomplished according to exact match and broad match techniques that are well known to those of skill in the art.

The one or more keywords maintained in the content data store 142 may be organized according to a keyword group or groups. A keyword group may comprise one or more keywords with similar expected performance with regard to one or more items of metric data. According to one embodiment, keywords with similar expected performance include one or more keywords associated with one or more advertisements displayed during a given time period, one or more keywords associated with one or more advertisements displayed at a given position within an ordered list of advertisements and one or more keywords associated with a given category.

Keywords and keyword groups may be organized in accordance with one or more keyword clusters; a given keyword cluster comprising one or more keywords. A given keyword group may be contained in a single keyword cluster or, alternatively, may be contained in multiple keyword clusters.

The one or more keywords maintained in the content data store 142 may further be associated with one or more advertiser specified bids. A bid amount for a given keyword provides an indication of the maximum dollar amount to be spent by an advertiser on a user selection of an advertisement associated with the respective keyword, e.g., a user click. The search server 134 may utilize the bids associated with the one or more keywords to select one or more advertisements for distribution to one or more client devices 124, 126, and 128. For example, a given user of a client device may deliver a search request to the search server 134 comprising the term "laptop." The search server 134 may identify ten ("10") advertisers that have provided bids for the keyword "laptop." Additionally, the search server 134 may identify the advertiser specified advertisements to be displayed in response to the keyword "laptop" and may rank the advertisements in part according to the bid amount provided by a given advertiser.

Metric data regarding the advertisements that may be displayed within one or more web pages 152 and 154 and those that are selected by one or more users of client devices 124, 126, and 128 may be retrieved and delivered to a metric data store 114 at the search server 134. The metric data store 114 may comprise an accessible memory structure such as a database, CD-ROM, tape, digital storage library, etc. The metric data store 114 may be operative to maintain metric data for one or more keywords and corresponding advertisements. The metric data store 114 may be implemented as a database or any other type of data storage structure operative to provide for the retrieval and storage of data for one or more keywords and corresponding advertisements.

Data regarding the advertisements associated with one or more keywords may comprise data including, but not limited to, the keyword that resulted in the display of a given advertisement, the frequency with which a given advertisement was selected by one or more users, and the frequency with which a given advertisement was displayed within one or more web pages 152 and 154. Additionally, data regarding the advertisements associated with one or more keywords may comprise data indicating a day of the week and a time at which one or more advertisements were displayed in response to a given keyword, as well as the position at which one or more advertisements were displayed in response to one or more keywords, wherein a position may comprise a rank or a location within a given web page 152 and 154. According to one embodiment, these data are stored on a per keyword and per advertiser basis.

As previously described, a user of a client device 124, 126, and 128 may select one or more of the advertisements displayed within a web page 152 and 154 by the search server 134. The selection of an advertisement by a given user of a client device 124, 126, and 128 may result in the user being redirected to a landing page 160 and 162 with which a given advertisement is associated.

According to the embodiment illustrated in FIG. 1, a bid management server 100 communicatively coupled to the network 122 is operative to receive information indicating that a given landing page 160 and 162 associated with a given advertisement was displayed to a user of a client device 124, 126, and 128. The bid management server 100 stores the information associated with a given landing page 160 and 162 displayed in response to the selection of a given advertisement in an event data store 107. The event data store 107 is operative to maintain at least information indicating the advertisement that resulted in the display of a given landing page, as well as the keyword that resulted in the display of the advertisement. The event data store 107 may be implemented as a database or any other type of storage structure capable of providing for the retrieval and storage of data associated with the display of one or more landing pages 160 and 162.

The event data store 107 at the bid management server 100 is further operative to receive and store data associated with a conversion, wherein a conversion may comprise a purchase of a product or service associated with a given advertisement displayed to a user of a client device 124, 126, and 128. The information associated with a conversion may be delivered to the bid management server 100 and maintained in the event data store 107. According to one embodiment of the invention, the information associated with a conversion comprises the advertisement selected that resulted in the conversion, as well as the keyword that resulted in the display of the advertisement selected.

The event data store 107 may also store data associated with one or more actions performed by a user of a client device 124, 126, and 128 with respect to a given advertisement or a given landing page 160 and 162 associated with an advertisement. For example, a landing page 160 and 162 displayed in response to the selection of a given advertisement may display one or more additional advertisements that may be selected by a user of a client device 124, 126, and 128. Information indicating the one or more advertisements displayed within a landing page 160 and 162 that are selected by a user of a client device 124, 126, and 128 may be delivered to the event data store 107. Similarly, a landing page 160 and 162 displayed in response to the selection of a given advertisement may allow a user of a client device 124, 126, and 128 to perform various actions, such as purchase a product, register for a newsletter, participate in a survey, request additional information, etc. Information indicating the one or more actions performed by a user of a client device 124, 126, and 128 with respect to a given landing page 160 and 162 displayed in response to the selection of a given advertisement may be delivered to the event data store 107.

The bid management server 100 is operative to utilize the metric data maintained in the event data store 107 and the metric data store 114 at the search server 134 to generate bids for one or more keywords associated with the one or more advertisements. According to the embodiment illustrated in FIG. 1, a bid component 106 at the bid management server 100 is operative to identify one or more keywords for which bids are to be generated. A data retrieval component 102, which may be located at the bid management server 100, is operative to retrieve metric data from the search server 134 for the one or more keywords for which the bid component 106 is to generate bids.

According to one embodiment of the invention, the data retrieval component 102 is operative to retrieve metric data for one or more keywords for a given period of time. For example, the data retrieval component 102 may be operative to retrieve metric data from the analytics data store 114 for a twenty-four hour period of time for the one or more keywords for which the bid component 106 is to generate bids. Similarly, the data retrieval component 102 may be operative to retrieve data from the analytics data store 114 on an hourly or other periodic basis for the one or more keywords or keyword groups for which the bid component 106 is to generate bids.

The metric data that the data retrieval component 102 retrieves from the metric data store 114 may comprise the abovementioned metric data that may be associated with one or more keywords. For example, the data retrieval component 102 may retrieve data regarding keywords, including the frequency with which the one or more advertisements were displayed in response to a keyword, and the frequency with which the one or more advertisements associated with a given keyword were selected. Similarly, the data retrieval component 102 may retrieve data associated with one or more keywords indicating the time at which one or more advertisements were displayed in response to one or more keywords, the day of the week at which the one or more advertisements were displayed in response to the one or more keywords, the position at which the one or more advertisements were displayed in response to the one or more keywords, an advertiser bid for a given keyword, etc.

The data retrieval component 102 is further operative to retrieve metric data that the event data store 107 maintains and which corresponds to the one or more keywords and advertisements. The data retrieval component 102 may retrieve information from the event data store 107 indicating the number of landing pages displayed to users of client devices in response to the selection of an advertisement associated with a given keyword. Similarly, the data retrieval component 102 may retrieve information from the event data store 107 indicating the one or more actions performed by one or more users, including but not limited to, the number of conversions associated with one or more keywords and advertisements, in addition to other metric data that event data store is operative to maintain.

The data retrieved by the data retrieval component 102 for the one or more keywords for which bids are to be generated is delivered to the bid component 106 at the bid management server 100. The bid component 106 is operative to aggregate the data retrieved by the data retrieval component 102 for a given period of time and generate one or more bids for the one or more keywords. The one or more bids generated by the bid component 106 for the one or more keywords comprise bids that generate the greatest estimated profit for display of an advertisement associated with a given keyword, subject to constraints on achieving a given return on investment by a certain probability.

According to one embodiment of the invention, the bid component 106 is operative to identify one or more keywords for which bids are to be generated, which may include the identification of one or more keyword groups with which the keywords associated, as well as one or more clusters with which the keywords and keyword groups may also be associated. According to one embodiment, the bid component 106 is operative to identify one or more keywords for which the bid component 106 is to generate bids and interact with the data retrieval component 102 to retrieve metric information from the metric data store 114 and the event data store 107 regarding the same. The metric information that the data retrieval component 102 retrieves may be aggregate metric information for the keywords that the bid component identifies 106.

The bid component 106 utilizes the metric data for the keywords that it identifies in accordance with one embodiment to perform a multistage estimation process, which may also be performed as a single stage estimation process. The bid component 106 may generate mean conversion rates for the one or more metrics for the one or more keywords using metric data associated with the keywords and one or more advertisements displayed in response to the one or more keywords matching a user query.

Utilizing a metric estimation process that is described in greater detail herein, the bid component 106 may generate one or more estimates of a click-to-action conversion rate for the one or more keywords, which may be organized in accordance with one or more keyword groups, as well as one or more keyword clusters. The bid component 106 is further operative to generate one or more estimates of an impressionto-click rate for the one or more keywords that the bid component identifies. The bid component may also generate one or more estimates of a bid amount for the one or more keywords to display one or more advertisements in response to the one or more keywords at one or more positions, as well as one or more estimates of a cost for a user selection of an advertisement displayed at the one or more positions in response to a keyword that matches a user query.

The bid component 106 identifies an interesting keyword group that the bid component 106 selects from the one or more keyword groups to which the identified keywords belong. According to one embodiment, an interesting keyword group is a given keyword group that has a sufficient quantity of metric data to warrant the refinement of the estimates for the given group. According to still further embodiments of the invention, a keyword group may be interesting with regard to one metric but not interesting with regard to other metrics, meaning that some metrics associated with a keyword group may comprise a sufficient quantity of data to warrant refinement of a metric estimate whereas others may not. If the keyword group is an interesting keyword group, the bid component 106 generates specific metric estimates for the keywords in the interesting keyword group. According to one embodiment, the bid component 106 generates a specific click-to-action conversion rate estimate, a specific impression-to-click rate estimate, a specific bid estimate and a specific cost estimate for the keywords included in the interesting keyword group. The specific estimates deviate from the general estimates that the bid component 106 generates for the identified keywords in that they emphasize the metric data that is specific to the metrics associated with the keywords in a given interesting keyword group.

The one or more estimates of the click-to-action conversion rate, impression-to-click rate, bid, and cost are used by the bid component 106 to generate a bid amount for the one or more keywords that the bid component 106 identifies. The bid component 106 generates bid amounts for keywords in an interesting keyword group through the utilization of the specific metric estimates that the bid component 106 generates for a given interesting keyword group. According to one embodiment of the invention, the bid component 106 identifies one or more target positions for the one or more keywords, wherein a target position comprises a position in ranked list of one or more advertisements from which an advertisement associated with a keyword may be selected for display in response to a search that matches the keyword.

The one or more target positions are identified on the basis of an estimated return on investment earned by the display of the one or more advertisements in response to a query that matches a given one of the one or more keywords exceeding a threshold by a given probability. The bid component 106 determines the estimated return on investment and probability of exceeding the threshold on the basis of the metric estimates and selects a given target position that provides a greatest estimated profit. According to one embodiment, profit associated with a given position comprises the difference between the revenue per impression and the cost per impression for displaying an advertisement at a given position in response to a query that is matched to a keyword with which the advertisement is associated.

The bid component 106 identifies a position associated with the greatest estimated profit for the one or more keywords for which bids are to be generated. The bid component 106 generates a bid amount for the one or more keywords in order to obtain the display of associated advertisements at the given target position in response to a query that matches a given one of the one or more keywords. The bid component 106 may deliver the one or more bids that it generates for storage in the content data store 142, as well as various combinations of this and other data stores. The search server 134 may utilize the bids generated by the bid component 106 to select advertisements responsive to search requests that are matched to one or more keywords received from client devices 124, 126, and 128.

Figure 2A:
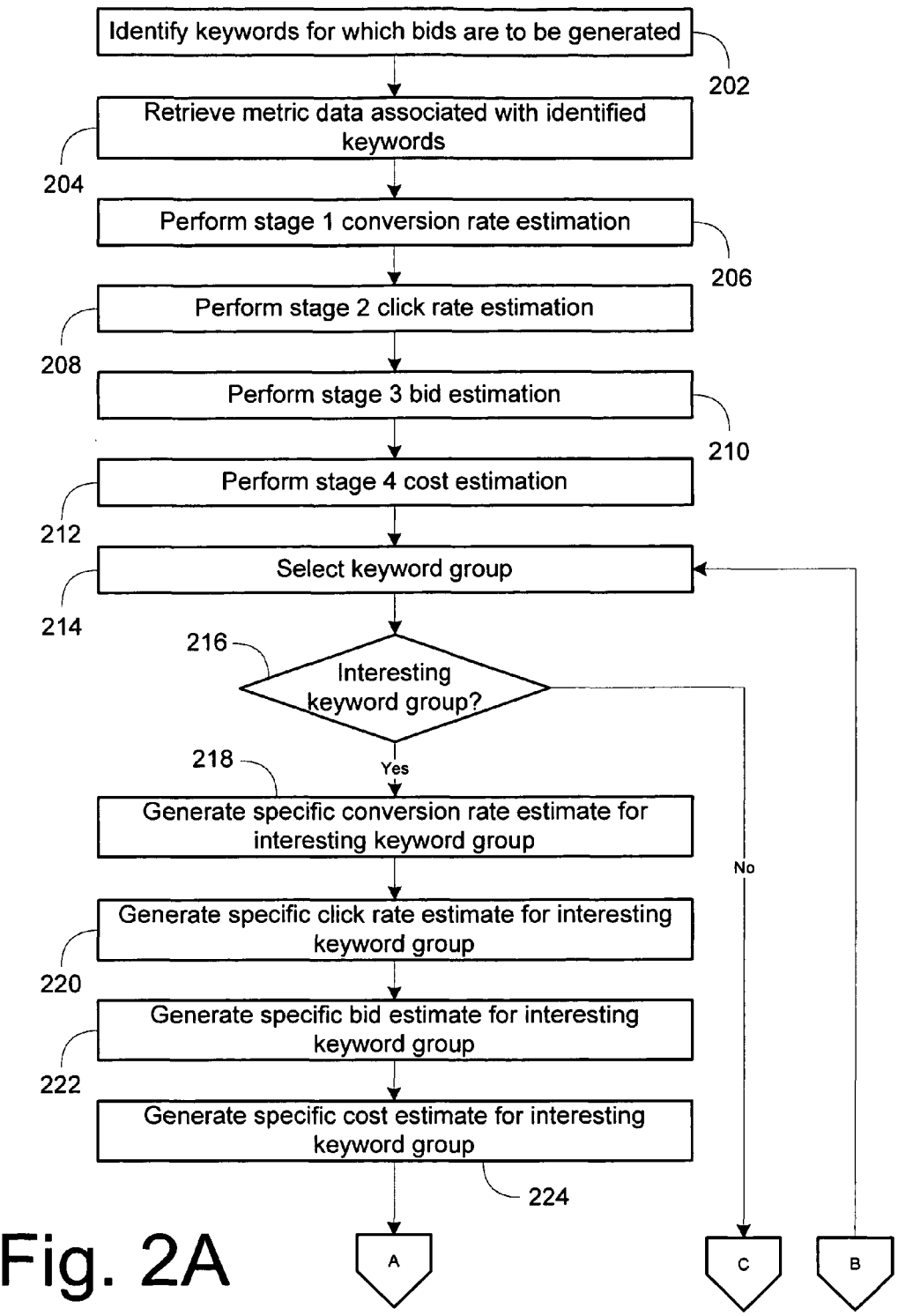
FIG. 2A is a flow diagram presenting a method for generating one or more bids for one or more keywords using metric data associated with the one or more keywords according to one embodiment of the present invention.
Figure 2B:
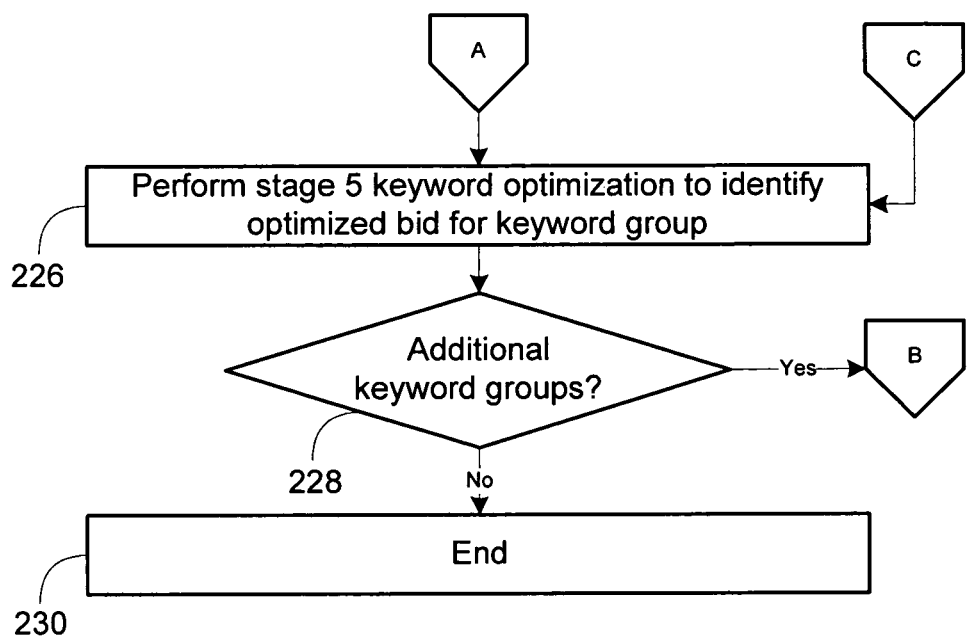
FIG. 2B is a flow diagram that continues the flow diagram of FIG. 2A for generating one or more bids for one or more keywords using metric data associated with the one or more keywords according to one embodiment of the present invention.

One embodiment of a method for generating bid amounts for one or more keywords for the display of an advertisement associated with a given keyword when the given keyword matches a user query is illustrated in FIGS. 2A and 2B. The method according to the present embodiment begins with the identification of one or more keywords for which bids are to be generated, step 202, and the retrieval of metric data associated with the one or more keywords, step 204.

An estimation process generates metric estimates for the one or more keywords, steps 206, 208, 210 and 212, which may be a four stage estimation process. One or more click-to-conversion action rate metric estimates are calculated, step 206, as well as one or more impression-to-click rate metric estimates, step 208. The method may further comprise the calculation of one or more bid amount metric estimates, step 208, and one or more cost metric estimations, step 212.

The process continues with the identification of interesting keyword groups from among one or more keyword groups according to which the one or more keywords are organized and a check is performed to determine if a given keyword group is an interesting keyword group, step 216. Where the given keyword group is not interesting, processing may proceed directly to step 226 in FIG. 2B for the generation of a bid, which is explained in greater detail herein. Where the check evaluates to true, step 216, one or more keyword group specific metric estimates are generated, steps 218, 220, 222 and 224.

A click-to-action conversion rate metric estimation is performed to generate one or more keyword group specific click-to-action conversion rate estimates for the one or more keywords comprising the given keyword group, step 218. According to one embodiment, the metric estimation is performed using the metric data associated with the one or more keywords comprising the given keyword group. A keyword group specific click-to-action conversion rate estimate for a given keyword group identifies an expected conversion rate for the keyword group when one or more advertisements are displayed at one or more positions in a ranked list of advertisements in response to a search request that matches a keyword in the given keyword group.

An impression-to-click rate metric estimation is performed to generate one or more keyword group specific impression-to-click rate metric estimates for the one or more keywords associated with the given keyword group, step 220. According to one embodiment, an impression-to-click rate estimation for a given keyword group identifies an expected rate per impression with which one or more users will select one or more advertisements displayed at one or more positions in a ranked list of advertisements in response to a search request that matches a keyword in the given keyword group. The keyword specific click rate metric estimates may be generated through use of the metric data associated with the one or more keywords comprising the selected keyword group selected, which is applicable to estimation techniques described herein.

A bid metric estimation is performed to generate keyword group specific bid metric estimates, step 222. A bid metric estimate for a given keyword group comprises an estimate of a bid amount necessary to display one or more advertisements at one or more positions in a ranked list of advertisements in response to a search request that matches a keyword in the given keyword group. Additionally, cost metric estimation may be performed to generate keyword group specific cost metric estimates, step 224. A keyword group specific cost metric estimate is an estimate of a cost associated with the display of an advertisement at one or more positions in a ranked list of advertisements in response to a search request that matches a keyword in the given keyword group. The keyword group specific bid and cost metric estimates generated for the one or more keywords identified as belonging to the given keyword group may be generated through use of the metric data associated with the one or more keywords comprising the keyword group.

Regardless of whether the given keyword group is an interesting keyword group, step 216, processing continues at FIG. 2B with the generation of one or more bids for the given keyword group, step 226, which may be optimized in accordance with the aggregate keyword metric estimates (steps 206, 208, 210 and 212) or the keyword group specific metric estimates (steps 218, 220, 222 and 224). According to one embodiment, one or more target positions are identified at which a return on investment earned by the display of an advertisement in response to a query that matches a given keyword in the given keyword group exceeds a threshold by a given probability, which may be determined on the basis of the metric estimates. Accordingly, a given target position from among the one or more target positions is identified as providing a greatest estimated profit and a bid amount is generated in order to obtain display of an advertisement associated with the keyword at the target position in response to a query that matches a given one of the one or more keywords in the given keyword group, step 226.

Bid amounts are calculated for the given keyword group, step 226, and a check is performed to determine if additional keyword groups require analysis, step 228. Where additional keyword groups exist that require analysis, processing returns to step 216 in FIG. 2A where a check is performed to determine if a subsequent keyword group is an interesting keyword group. Where no additional keyword groups require analysis, step 228, processing terminates, step 230.

Figure 3:
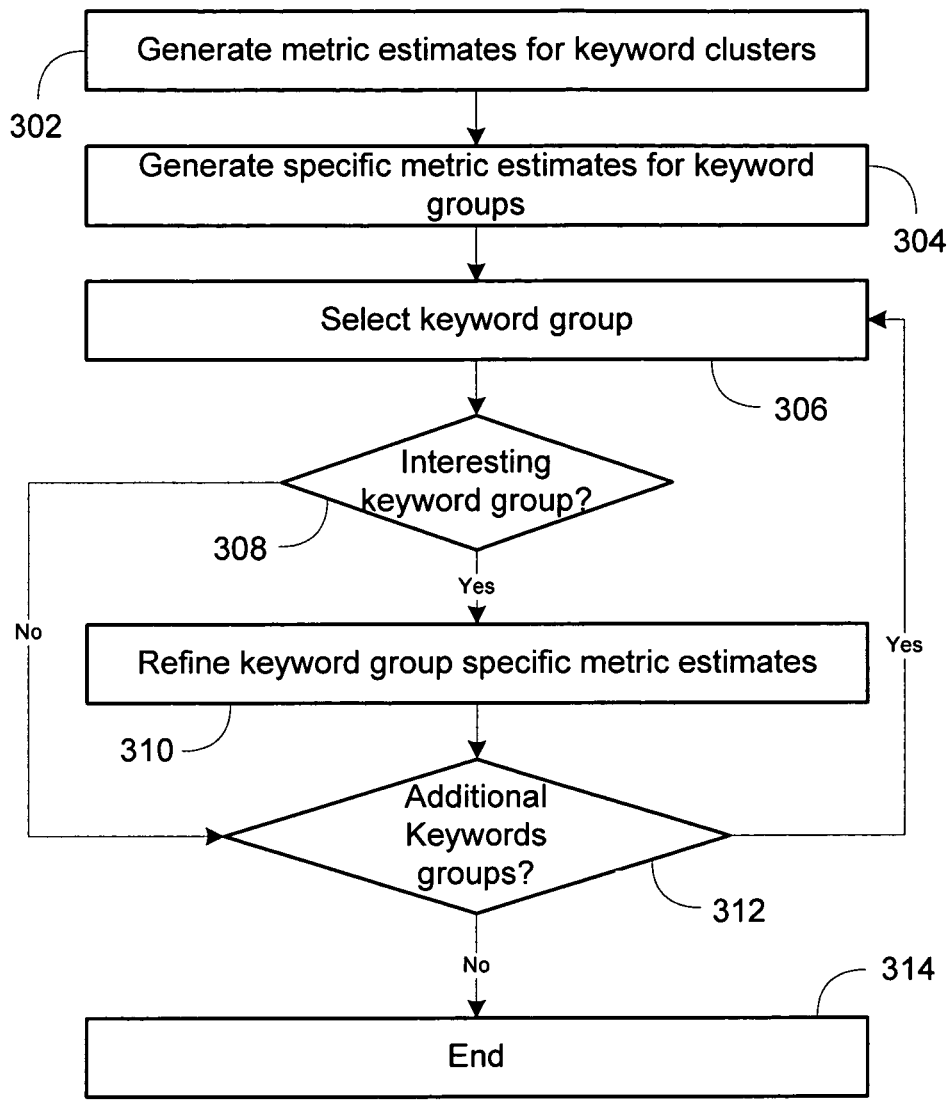
FIG. 3 is a flow diagram presenting a method for estimating keyword specific metric data for one or more keywords comprising one or more keyword groups according to one embodiment of the present invention.

As discussed herein, systems and methods according to the present invention generate metric estimates for one or more metrics associated with a given keyword group or given keyword comprising the given keyword group. One embodiment for generating metric estimates in accordance with the present invention is illustrated in FIG. 3, which may be employed to generate one or more click-to-action, impression-to-click, bid, cost, and bid-cost delta metric estimates. The process may begin with performance of an analysis upon metric data associated with one or more keyword clusters (or keyword groups or keywords within the given cluster) to generate one or more metric estimates for the one or more keyword clusters, step 302, which may comprise the generation of mean metric estimates for a given keyword cluster from among the one or more keyword clusters.

As indicated above, keyword groups may be organized into one or more keyword clusters. Keyword clusters may be "hard" clusters or "soft" clusters. A hard cluster is a collection of one or more keyword groups whereby a given keyword group belongs to a single cluster. Conversely, a soft cluster is a collection of one or more keyword groups whereby a given keyword group belongs to one or more keyword clusters. When utilizing either hard or soft clusters, a keyword cluster according to some embodiments of the invention comprises one or more keywords.

The aforementioned analysis that is performed on the metric information associated with the one or more keyword clusters may comprise estimating the parameters of a generalized linear model, which may further comprise estimating the parameters of a penalized generalized linear model. In one embodiment, the generalized linear model comprises a logistic regression model. Alternatively, performing an analysis may comprise estimating the parameters of a generalized linear model through the use of a standard ordinary least squares regression model, e.g., when the metric information comprises bid or cost metric information. According to one embodiment, a response variable is a natural logarithm of the observed bid utilized by a standard ordinary least squares regression model. Additionally, the generalized linear model may comprise a model with a Normal random component and a logarithmic link function, or a Gamma random component and a logarithmic link function.

According to one embodiment, a generalized linear model with input data comprising metric data associated with the one or more keyword clusters is analyzed to generate metric estimates of the one or more keyword clusters. A generalized linear model analysis may comprise a standard linear regression performed upon a design matrix X to identify one or more optimal coefficient values β and a precision matrix K. Table A illustrates one embodiment of an equation that may be used to identify one or more optimal coefficient values β.

TABLE A $$\beta = (X^T X)^{-1} * X^T y$$

In the equation illustrated in Table A, β comprises one or more optimal coefficient values, X comprises the design matrix, and y comprises the observed bid values.

An estimate of the variance of the noise in the one or more observations associated with the one or more keyword clusters may also be calculated, wherein an observation associated with a given keyword cluster includes, but is not limited to, a position, day, time, etc. at which an advertisement associated with a keyword cluster was displayed, as well as the metric data associated with the keyword cluster, such as the frequency with which advertisements associated with the keyword cluster were selected by one or more users, resulted in a conversion, etc. Table B illustrates one embodiment of an equation that may be used to estimate a variance in the noise in the one or more observations associated with the one or more keyword clusters:

TABLE B $$\hat{\sigma}^2 = \left( \frac{\sum_{i=1}^{N} (y_i - \hat{y}_i)^2}{n - p} \right)$$

In the equation illustrated in Table B, n comprises the number of observations and p comprises the number of parameters. The $\{y_i\}$ represent the observed bid values and the $\{\hat{y}_i\}$ represent the fitted bid values.

According to one embodiment, a precision matrix K and a variance matrix V is calculated for the one or more optimal coefficient values β using the equations illustrated in Table C:

TABLE C $$K = \frac{1}{\hat{\sigma}^2} X^T W X$$

$$V = K^{-1} = \hat{\sigma}^2 (X^T W X)^{-1}.$$

According to Table C, X is the aforementioned design matrix and W is a weights matrix associated with the optimal coefficient values β.

On the basis of the metric estimates for the one or more keyword clusters, step 302, one or more metric estimates are generated for the one or more keyword groups (which may comprise one or more keywords) through the use of an estimation procedure that incorporates the mean metric estimates and the variances around those mean metric estimates for the given keyword clusters to which a given keyword group belongs, step 304. As is explained in greater detail herein, generating metric estimates for the one or more keyword groups may comprise estimating the parameters of a penalized generalized linear model, which may comprise a logistic ridge regression. According to one embodiment, the penalty factors of the penalized generalized linear model are estimated through cross-validation. Estimating the parameters of the penalized generalized linear model may be approximated through the use of a gradient descent algorithm, and the penalty factors of the gradient descent approximation to the penalized generalized linear model may be estimated through cross validation. Those of skill in the art recognize that different models may be utilized to generate the cluster and keyword group metric estimates, which may be based on the specific metric estimate being generated, e.g., click-to-action conversion rate, impression-to-click rate, bid, cost and bid-cost delta.

Table D illustrates one embodiment of an equation that may be used to generate metric estimates for each keyword group unconstrained by the keyword cluster membership of the keyword groups through use of a penalized generalized linear model and metric estimates for the keyword clusters:

TABLE D $$\text{MIN} - L + \lambda * (\beta_P - \gamma_P)^T * K_P * (\beta_P - \gamma_P)$$

In the equation illustrated in Table D, L represents the log-likelihood of the generalized linear model and $\lambda*(\beta_P-\gamma_P)^T*K_P*(\beta_P-\gamma_P)$ represents a penalty term. The subscript P indicates that the penalty only applies to parameters associated with keyword attributes. The term $\beta_P\gamma_P$ comprises the difference between the keyword group-specific parameters and the cluster-specific parameters. $\lambda$ comprises the penalty factor that scales the penalty term relative to the log-likelihood term. $K_P$ comprises information retrieved from the precision matrix of the cluster parameter estimates $\gamma_P$.

According to one embodiment, when the parameter estimates are obtained by solving a generalized linear model with Normal random component and logarithmic link function, the penalty matrix $K_P$ is computed using the equations illustrated in Table E:

TABLE E $$\mu = \exp(X_c \gamma)$$

$$w = \mu^2$$

$$\begin{bmatrix} K_P & K_{PN} \\ K_{NP} & K_N \end{bmatrix} = X_9^T W X_9.$$

In Table E, $\gamma$ represents the vector of metric parameter estimates based on the keyword cluster membership, $X_c$ represents the keyword cluster design matrix, and $X_g$ represents the keyword group design matrix. Furthermore, $\mu$ represents the vector of mean metric estimates for each observation based on the keyword cluster membership, w represents the vector of estimated weights for each observation based on the keyword cluster membership, and W represents the diagonal matrix with vector w on the diagonal.

In one embodiment, when a gradient descent approximation is employed to solve a partially penalized generalized linear model, such as that illustrated in Table D, the update to the penalized parameters at each step of the gradient descent approximation is as shown in Table F:

TABLE F $$\beta_P^k = \beta_P^{k-1} + \Delta K_P^{-1} X_P^T s^{k-1}.$$

In Table F, $\beta_P^k$ (respectively, $\beta_P^{k-1}$) represents the penalized parameter estimates at the $k^{th}$ step (respectively, $(k-1)^{th}$ step) in the gradient descent, $K_P$ represents the penalty matrix for the penalized parameters, $X_P$ represents the submatrix of the design matrix X that includes the columns corresponding to the penalized parameters, and $s^{k-1}$ represents the score vector computed based on the parameter estimates at the $(k-1)^{th}$ step in the gradient descent. At the $k^{th}$ step of the gradient descent approximation, the estimates for the non-penalized parameters may be computed by solving an unpenalized generalized linear model with an offset $X_P\beta_P^k$ to the linear predictor computed from the parameter estimates of the penalized parameters at that step.

Cross validation, in the context of a logistic ridge regression model, or of a gradient descent approximation, may be used to identify a penalty to be applied to a difference between parameter estimates for a given keyword group inherited from the keyword clusters of which the given keyword group is a member and parameter estimates for the given keyword group that are not constrained by the keyword clusters of which that keyword group is a member. For example, a parameter for a conversion rate estimate for a given keyword group inherited from the keyword clusters of which the given keyword group is a member may comprise the value –2.55, whereas a parameter for a conversion rate estimate for the given keyword group unconstrained by its keyword cluster membership may comprise the value –1.72. Cross-validation may be used to identify the penalty to apply to the difference between the constrained conversion rate parameter estimate of –2.55 and the unconstrained conversion rate parameter estimate of –1.72.

According to one embodiment, when the optimal coefficient values $\beta$ are computed using a gradient descent approximation to a penalized generalized linear model in which the generalized linear model is a standard regression model, a precision matrix K and a variance matrix V is calculated for the one or more optimal coefficient values $\beta$ using the equations illustrated in Table G:

TABLE G $$\mu = X\beta$$

$$s = y - \mu$$

$$s(\beta) = X^T s$$

$$\omega_j = \max\left(0, \frac{s_j(\beta)}{\beta_j - \gamma_j}\right)$$

$$K = \frac{1}{\hat{\sigma}^2}(X^T X + \Omega)$$

$$V = K^{-1}.$$

In the equations illustrated in Table G, X is the abovementioned design matrix, j ranges from 1 to p, wherein p is the number of columns in the design matrix X. $\omega_j$ are the elements of a diagonal matrix $\Omega$. y is the vector of observations, and $\gamma_j$ are the prior parameter estimates derived from the estimates in the previous phase. $\beta$ represents the parameter value estimates, $\mu$ are the fitted observation means, s is the vector of scores for each observation, and $\sigma$ is the estimate of the variance of the noise in the one or more observations.

A given keyword group is selected from among the one or more keyword groups, step 306, and a check is performed to determine if the given keyword group is an interesting keyword group, step 308. Where the given keyword group is not an interesting keyword group, a subsequent check is performed to determine if there are additional keyword groups available for analysis, step 312. Where the check evaluates to true, a subsequent keyword group is selected, step 306.

Where the given keyword group is an interesting keyword group, step 308, the metrics for the selected keyword group may be refined to allow for interactions between the metrics for the selected keyword group and the other dimensions, e.g., position, day of week, and time of day, step 310. According to one embodiment of the invention, the refined conversion rates are generated through use of a logistic ridge regression model solved using a cross-validated gradient descent. The logistic ridge regression may be performed to determine refined conversion rates for a given keyword group that utilizes one or more conversion rate estimates for the given keyword group and other dimensions including, but not limited to, position, day of week, and time of day at which one or more advertisements associated with one or more keywords comprising the given keyword group were displayed in response to one or more search requests containing the keyword.

One or more metric estimates associated with the interesting keyword group are refined, step 310, and a subsequent check is performed to determine if there are additional keyword groups available for analysis, step 312. Where no additional keyword groups are present, step 312, the process terminates, step 314.

Figure 4:
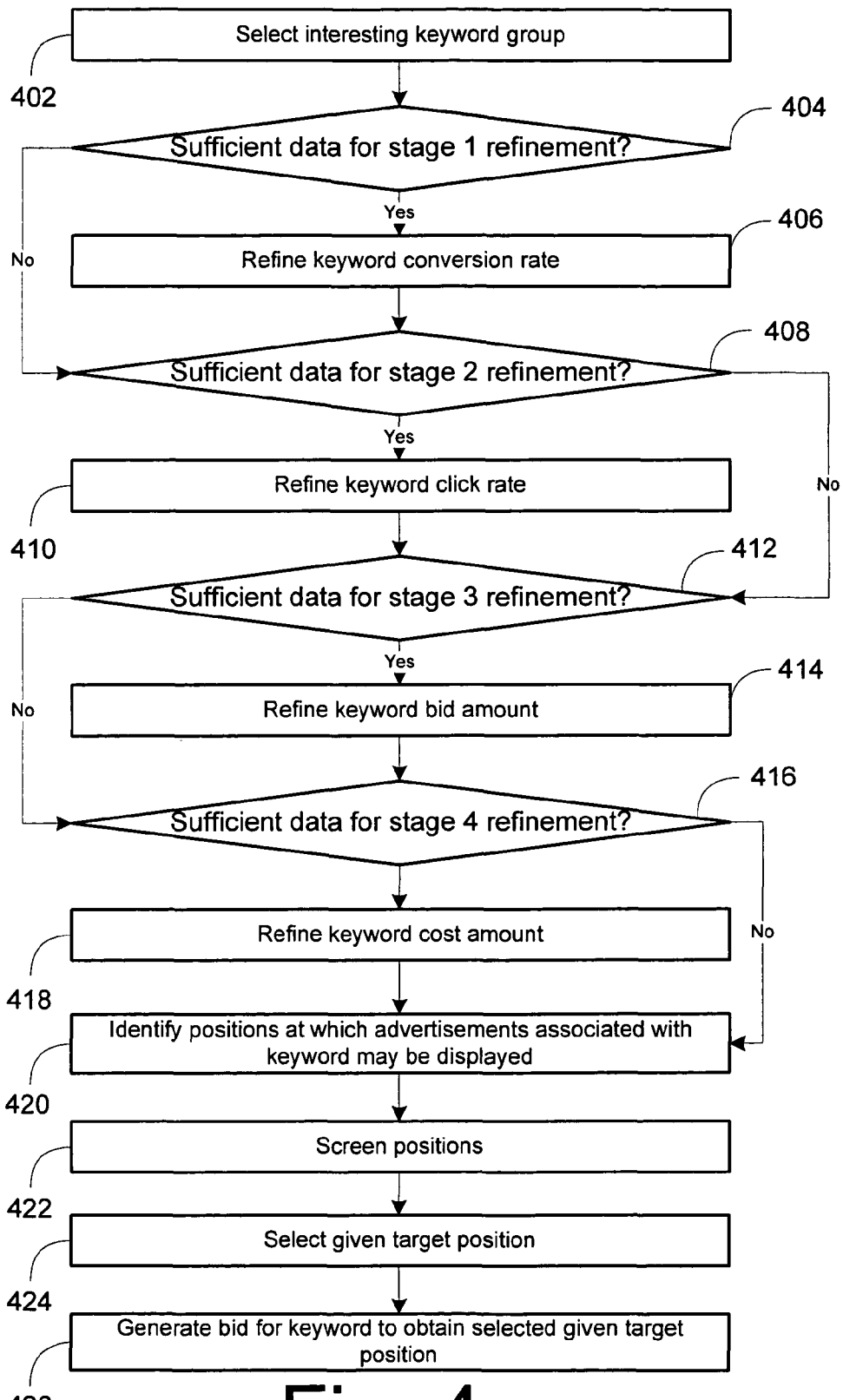
FIG. 4 is a flow diagram presenting a method for refining one or more advertising metric values and generating bids for one or more keywords according to one embodiment of the present invention.

The refinement of keyword group specific estimates, which may be limited to the refinement of keywords comprising interesting keyword groups, may operate in accordance with the method illustrated in FIG. 4. An interesting keyword group is selected, step 402, and a check is performed to determine whether sufficient metric data is associated with the selected keyword group to refine the keyword group specific click-to-action conversion rate estimate generated for the aggregate keywords, step 404. If sufficient metric data is associated with the selected keyword group, a cross-validated binomial logit gradient descent is performed upon the aggregated keyword metric estimation, step 406.

If the selected keyword group does not comprise sufficient metric information, step 404, or after the keyword group conversion rate estimate has been refined, step 406, a check is performed to determine whether sufficient data is associated with the selected keyword group to warrant a refinement of the impression-to-click rate metric estimate associated with the selected keyword group, step 408. If sufficient metric data is associated with the given keyword group, a cross-validated gradient descent is performed upon the aggregated keyword impression-to-click rate metric estimate, step 410.

If the selected keyword group does not comprise sufficient metric information, step 408, or after the keyword group impression-to-click rate estimate has been refined, step 410, an additional check is performed to determine whether sufficient metric information is associated with the given keyword group for a refinement of the one or more bid estimates associated with the given keyword group, step 412. If sufficient metric data is associated with the given keyword group, a cross-validated gradient descent is performed upon the aggregate keyword bid estimates, step 414.

If the selected keyword is not associated with sufficient data, step 412, or after the bid estimates have been refined, step 414, an additional check is performed to determine whether sufficient metric information is associated with the selected keyword group to perform a refinement of the cost metric estimates associated with the given keyword group, step 416.

If the selected keyword group is not associated with sufficient metric information to refine the one or more cost metric estimates associated with the given keyword group, or after the cost metric estimates associated with the given keyword group have been refined through use of a cross-validated gradient descent, step 418, one or more target positions at which one or more advertisements associated with the keyword group may be displayed in response to a search request matching a given keyword in the given keyword group are identified, step 420.

A screening process may be performed upon the one or more identified target positions to identify the one or more positions associated with a return on investment earned by the display of one or more advertisements in response to a query that matches a given keyword from the given keyword group exceeds a threshold by a given probability, step 422. Table H illustrates one embodiment of an equation for computing the probability of a given position meeting or exceeding a target return on investment value:

TABLE H $q_p = P \{N (\mu(\log(\pi_p)) - \mu(\log(y_p)), \text{Var}(\log(\pi_p)) + \text{Var}(\log(y_p))) \geq \log(1 + \rho) - \log(r)\}$ In the equation illustrated in Table H, $N(\mu, \sigma^2)$ represents a normal distribution with mean $\mu$ and variance $\sigma$. A given position is screened, or otherwise removed from the set of one or more target positions, if $q_p$ is less than $\gamma$. $\pi_p$ represents the conversion rate in position p, whereas $\mu(\log(\pi_p))$ and $\text{Var}(\log(\pi_p))$ are estimates of a mean and variance of the log of $\pi_p$. $\gamma_p$ represents the cost per click in position p, whereas $\mu(\log(\gamma_p))$ and $\text{Var}(\log(\gamma_p))$ are estimates of the mean and variance of the log of $\gamma_p$. r represents the revenue per action and $\rho$ is the target return on investment.

A given target position is selected for the given keyword group. According to one embodiment, a selected target position is the position at which the estimated profit associated with the selected keyword is the greatest, step 424. Table I illustrates one embodiment of an equation that may be used to compute the expected profit associated with a given position:

TABLE I $P_p = (r \exp(\mu(\log(\pi_p))) - \exp(\mu(\log(y_p)))) \exp(\mu(\log(m_p)))$ In the equation illustrated in Table I, $m_p$ represents the impression to click rate in position p, whereas $\mu (\log(m_p))$ is an estimate of the mean of the log of $m_p$. A bid is generated for the selected target position in order to obtain the display of associated advertisements at the selected target position in response to a query that matches a given keyword in the keyword group, step 426. For example, a bid may be generated so as to display one or more advertisements at the selected target position in response to a search request that matches the selected keyword.

FIGS. 1 through 4 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; electronic, electromagnetic, optical, acoustical, or other form of propagated signals (e.g., carrier waves, infrared signals, digital signals, etc.); or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments.

We claim:

1. A method comprising:
   accessing by one or more computer systems one or more keyword groups, each of the keyword groups comprising one or more keywords, each of the keywords in each of the keyword groups having one or more sets of metric values determined with respect to a set of advertising metrics and one or more advertising positions;
   for each of the keyword groups with respect to each of the advertising positions, calculating by the one or more computer systems one or more advertising metric estimates for the keyword group with respect to the advertising position based on the sets of metric values of the keywords in the keyword groups;
   for each of the keywords in each of the keyword groups with respect to each of the advertising positions, calculating by the one or more computer systems one or more advertising metric estimates for the keyword with respect to the advertising position based on the sets of metric values of the keywords in the keyword groups and the advertising metric estimates for the keyword groups with respect to the advertising positions; and
   for each of the keywords in each of the keyword groups:
      selecting by the one or more computer systems one of the advertising positions as a target advertising position for the keyword based on the advertising metric estimates for the keyword with respect to the advertising positions; and
      generating by the one or more computer systems a bid for the keyword with respect to the target advertising position that represents a recommended bid for having one or more advertisements corresponding to the keyword group to which the keyword belongs displayed in the target advertising position in response to one or more search requests matched to the keyword.

2. The method of claim 1, wherein:
   the set of advertising metrics comprises one or more advertising metrics, and
   for each of the keywords in each of the keyword groups:
      each of the sets of metric values uniquely corresponds to a different one of the advertising positions,
      each of the sets of metric values comprises one or more metric values,
      each of the metric values in each of the sets of metric values uniquely corresponds to a different one of the advertising metrics, and
      each of the metric values in each of the sets of metric values is determined for the keyword with respect to the advertising metric corresponding to the metric value and the advertising position corresponding to the set of metric values to which the metric value belongs.

3. The method of claim 2, further comprising, for each of the keywords in each of the keyword groups:
   determining by the one or more computer systems whether the keyword has sufficient metric data, wherein the sufficiency of the metric data is determined using one or more sufficiency tests based on a quantity of the metric values in the sets of metric values of the keyword satisfying a predetermined threshold requirement; and
   if the keyword has sufficient metric data, then, before generating the bid for the keyword, refining by the one or more computer systems the advertising metric estimates for the keyword based on the sets of metric values of the keyword.

4. The method of claim 3, wherein, for each of the keywords in each of the keyword groups, if the keyword has sufficient metric data, then refining the advertising metric estimates for the keyword comprises, for each of the advertising metric estimates, if the keyword has sufficient metric data with respect to the advertising metric estimate, then, before generating the bid for the keyword, refining the advertising metric estimate based on the metric values of the keyword.

5. The method of claim 3, wherein the advertising metric estimates for the keywords are refined using one or more statistical models.

6. The method of claim 5, wherein, for each of the keywords, the advertising metric estimates are refined using a penalized generalized linear model using the sets of metric values of the keyword as input parameters to the penalized generalized linear model.

7. The method of claim 6, wherein the penalized generalized linear model comprises a logistic ridge regression model that is solved using a cross-validated gradient descent.

8. The method of claim 1, wherein the advertising metric estimates for the keyword groups and the advertising metric estimates for the keywords are calculated using one or more statistical models.

9. The method of claim 8, wherein, for each of the keyword groups with respect to each of the advertising positions, each of the advertising metric estimates is calculated using a generalized linear model using the sets of metric values of the keywords in the keyword groups as input parameters to the generalized linear model.

10. The method of claim 9, wherein the generalized linear model comprises a logistic regression model, a standard ordinary least squares regression model, a model comprising a Normal random component and a logarithmic link function, or a model comprising a Gamma random component and a logarithmic link function.

11. The method of claim 8, wherein, for each of the keywords in each of the keyword groups with respect to each of the advertising positions, each of the advertising metric estimates is calculated using a penalized generalized linear model using the sets of metric values of the keywords in the keyword groups and the advertising metric estimates for the keyword groups with respect to the advertising positions as input parameters to the penalized generalized linear model.

12. The method of claim 11, wherein the penalized generalized linear model comprises a logistic ridge regression model.

13. The method of claim 12, wherein the logistic ridge regression model is solved using a cross-validated gradient descent.

14. The method of claim 11, wherein a solution of the penalized generalized linear model is approximated using a gradient descent.

15. The method of claim 1, wherein, for each of the keyword groups with respect to each of the advertising positions, calculating the advertising metric estimates for the keyword group with respect to the advertising position comprises, based on the sets of metric values of the keywords in the keyword groups, calculating one or more of:
a click-to-action conversion rate estimate for the keyword group with respect to the advertising position that represents an expected number of times one or more actions are performed on one or more web pages that are displayed as a result of one or more advertisements corresponding to the keyword group having been selected when displayed in the advertising position in response to a search request matched to one or more of the keywords in the keyword group;
an impression-to-click rate estimate for the keyword group with respect to the advertising position that represents an expected number of times one or more advertisements corresponding to the keyword group are selected when displayed in the advertising position in response to a search request matched to one or more of the keywords in the keyword group;
a bid estimate for the keyword group with respect to the advertising position that represents an expected bid associated with having one or more advertisements corresponding to the keyword group displayed in the advertising position in response to a search request matched to one or more of the keywords in the keyword group;
a cost estimate for the keyword group with respect to the advertising position that represents an expected cost associated with having one or more advertisements corresponding to the keyword group selected when displayed in the advertising position in response to a search request matched to one or more of the keywords in the keyword group; or
a bid-cost delta estimate for the keyword group with respect to the advertising position that represents an expected difference between a bid and a cost for the keyword group with respect to the advertising position, the bid representing an actual bid associated with having one or more advertisements corresponding to the keyword group displayed in the advertising position in response to a search request matched to one or more of the keywords in the keyword group, the cost representing an actual cost associated with having one or more advertisements corresponding to the keyword group selected when displayed in the advertising position in response to a search request matched to one or more of the keywords in the keyword group.

16. The method of claim 1, wherein, for each of the keywords in each of the keyword groups with respect to each of the advertising positions, calculating the advertising metric estimates for the keyword with respect to the advertising position comprises, based on the sets of metric values of the keywords in the keyword groups and the advertising metric estimates for the keyword groups with respect to the advertising positions, calculating one or more of:
a click-to-action conversion rate estimate for the keyword with respect to the advertising position that represents an expected number of times one or more actions are performed on one or more web pages that are displayed as a result of one or more advertisements corresponding to the keyword group to which the keyword belongs having been selected when displayed in the advertising position in response to a search request matched to the keyword;
an impression-to-click rate estimate for the keyword with respect to the advertising position that represents an expected number of times one or more advertisements corresponding to the keyword group to which the keyword belongs are selected when displayed in the advertising position in response to a search request matched to the keyword;
a bid estimate for the keyword with respect to the advertising position that represents an expected bid associated with having one or more advertisements corresponding to the keyword group to which the keyword belongs displayed in the advertising position in response to a search request matched to the keyword;

a cost estimate for the keyword with respect to the advertising position that represents an expected cost associated with having one or more advertisements corresponding to the keyword group to which the keyword belongs selected when displayed in the advertising position in response to a search request matched to the keyword; or a bid-cost delta estimate for the keyword with respect to the advertising position that represents an expected difference between a bid and a cost for the keyword with respect to the advertising position, the bid representing an actual bid associated with having one or more advertisements corresponding to the keyword group to which the keyword belongs displayed in the advertising position in response to a search request matched to the keyword, the cost representing an actual cost associated with having one or more advertisements corresponding to the keyword group to which the keyword belongs selected when displayed in the advertising position in response to a search request matched to the keyword.

17. The method of claim 16, wherein, for each of the keywords in each of the keyword groups, generating the bid for the keyword with respect to the target advertising position for the keyword comprises using the bid estimate for the keyword with respect to the target advertising position for the keyword as the bid.

18. The method of claim 1, wherein:
the advertising positions are organized in a ranked list; and
for each of the keywords in each of the keyword groups, selecting the target advertising position for the keyword comprises:
for each of the advertising positions, based on the advertising metric estimates for the keyword with respect to the advertising position, calculating a profit estimate for the advertising position that represents a difference between revenue per impression and cost per impression for displaying one or more advertisements in the advertising position in response to one or more search requests matched to the keyword; and
designating one of the advertising positions that has the greatest profit estimate as the target advertising position for the keyword.

19. The method of claim 1, wherein:
the advertising positions are organized in a ranked list; and
for each of the keywords in each of the keyword groups, selecting the target advertising position for the keyword comprises:
selecting one or more eligible advertising positions from the advertising positions, each of the eligible advertising positions having an estimated return on investment that meets a predetermined threshold requirement by a predetermined probability;
for each of the eligible advertising positions, based on the advertising metric estimates for the keyword with respect to the eligible advertising position, calculating a profit estimate for the eligible advertising position that represents a difference between revenue per impression and cost per impression for displaying one or more advertisements in the eligible advertising position in response to one or more search requests matched to the keyword; and
designating one of the eligible advertising positions that has the greatest profit estimate as the target advertising position for the keyword.

20. The method of claim 1, wherein the set of advertising metrics comprises one or more of:
one or more advertising attributes associated with one or more advertisements and the advertising positions;
one or more user attributes associated with one or more users; or
one or more keyword attributes associated with one or more of the keywords.

21. The method of claim 20, wherein the advertising attributes comprises one or more of:
a first number of times one or more advertisements corresponding to one of the keyword groups are displayed in one of the advertising positions in response to one or more search requests matched to one or more of the keywords in the keyword group;
a second number of times one or more advertisements corresponding to one of the keyword groups are selected when displayed in one of the advertising positions in response to one or more search requests matched to one or more of the keywords in the keyword group;
a third number of times one or more actions are performed on one or more web pages that are displayed as a result of one or more advertisements corresponding to one of the keyword groups having been selected when displayed in one of the advertising positions in response to one or more search requests matched to one or more of the keywords in the keyword group;
a cost associated with having one or more advertisements corresponding to one of the keyword groups selected when displayed in one of the advertising positions in response to one or more search requests matched to one or more of the keywords in the keyword group; or
a bid associated with having one or more advertisements corresponding to one of the keyword groups displayed in one of the advertising positions in response to one or more search requests matched to one or more of the keywords in the keyword group.

22. An apparatus comprising:
a memory comprising instructions executable by one or more processors; and
one or more processors coupled to the memory and operable to execute the instructions, the one or more processors being operable when executing the instructions to:
access one or more keyword groups, each of the keyword groups comprising one or more keywords, each of the keywords in each of the keyword groups having one or more sets of metric values determined with respect to a set of advertising metrics and one or more advertising positions;
for each of the keyword groups with respect to each of the advertising positions, calculate one or more advertising metric estimates for the keyword group with respect to the advertising position based on the sets of metric values of the keywords in the keyword groups;
for each of the keywords in each of the keyword groups with respect to each of the advertising positions, calculate one or more advertising metric estimates for the keyword with respect to the advertising position based on the sets of metric values of the keywords in the keyword groups and the advertising metric estimates for the keyword groups with respect to the advertising positions; and
for each of the keywords in each of the keyword groups:
select one of the advertising positions as a target advertising position for the keyword based on the advertising metric estimates for the keyword with respect to the advertising positions; and generate a bid for the keyword with respect to the target advertising position that represents a recommended bid for having one or more advertisements corresponding to the keyword group to which the keyword belongs displayed in the target advertising position in response to one or more search requests matched to the keyword.

23. The apparatus of claim 22, wherein:
the set of advertising metrics comprises one or more advertising metrics; and
for each of the keywords in each of the keyword groups:
  each of the sets of metric values uniquely corresponds to a different one of the advertising positions,
  each of the sets of metric values comprises one or more metric values,
  each of the metric values in each of the sets of metric values uniquely corresponds to a different one of the advertising metrics, and
  each of the metric values in each of the sets of metric values is determined for the keyword with respect to the advertising metric corresponding to the metric value and the advertising position corresponding to the set of metric values to which the metric value belongs.

24. The apparatus of claim 23, wherein the one or more processors are further operable when executing the instructions, for each of the keywords in each of the keyword groups, to:
determine whether the keyword has sufficient metric data, wherein the sufficiency of the metric data is determined using one or more sufficiency tests based on a quantity of the metric values in the sets of metric values of the keyword satisfying a predetermined threshold requirement; and
if the keyword has sufficient metric data, then, before generating the bid for the keyword, refine the advertising metric estimates for the keyword based on the sets of metric values of the keyword.

25. The apparatus of claim 24, wherein, for each of the keywords in each of the keyword groups, if the keyword has sufficient metric data, then to refine the advertising metric estimates for the keyword comprises, for each of the advertising metric estimates, if the keyword has sufficient metric data with respect to the advertising metric estimate, then, before generating the bid for the keyword, to refine the advertising metric estimate based on the metric values of the keyword.

26. The apparatus of claim 24, wherein the advertising metric estimates for the keywords are refined using one or more statistical models.

27. The apparatus of claim 26, wherein, for each of the keywords, the advertising metric estimates are refined using a penalized generalized linear model using the sets of metric values of the keyword as input parameters to the penalized generalized linear model.

28. The apparatus of claim 27, wherein the penalized generalized linear model comprises a logistic ridge regression model that is solved using a cross-validated gradient descent.

29. The apparatus of claim 22, wherein the advertising metric estimates for the keyword groups and the advertising metric estimates for the keywords are calculated using one or more statistical models.

30. The apparatus of claim 29, wherein, for each of the keyword groups with respect to each of the advertising positions, each of the advertising metric estimates is calculated using a generalized linear model using the sets of metric values of the keywords in the keyword groups as input parameters to the generalized linear model.

31. The apparatus of claim 30, wherein the generalized linear model comprises a logistic regression model, a standard ordinary least squares regression model, a model comprising a Normal random component and a logarithmic link function, or a model comprising a Gamma random component and a logarithmic link function.

32. The apparatus of claim 29, wherein, for each of the keywords in each of the keyword groups with respect to each of the advertising positions, each of the advertising metric estimates is calculated using a penalized generalized linear model using the sets of metric values of the keywords in the keyword groups and the advertising metric estimates for the keyword groups with respect to the advertising positions as input parameters to the penalized generalized linear model.

33. The apparatus of claim 32, wherein the penalized generalized linear model comprises a logistic ridge regression model.

34. The apparatus of claim 33, wherein the logistic ridge regression model is solved using a cross-validated gradient descent.

35. The apparatus of claim 32, wherein a solution of the penalized generalized linear model is approximated using a gradient descent.

36. The apparatus of claim 22, wherein, for each of the keyword groups with respect to each of the advertising positions, to calculate the advertising metric estimates for the keyword group with respect to the advertising position comprises, based on the sets of metric values of the keywords in the keyword groups, calculate one or more of:
  a click-to-action conversion rate estimate for the keyword group with respect to the advertising position that represents an expected number of times one or more actions are performed on one or more web pages that are displayed as a result of one or more advertisements corresponding to the keyword group having been selected when displayed in the advertising position in response to a search request matched to one or more of the keywords in the keyword group;
  an impression-to-click rate estimate for the keyword group with respect to the advertising position that represents an expected number of times one or more advertisements corresponding to the keyword group are selected when displayed in the advertising position in response to a search request matched to one or more of the keywords in the keyword group;
  a bid estimate for the keyword group with respect to the advertising position that represents an expected bid associated with having one or more advertisements corresponding to the keyword group displayed in the advertising position in response to a search request matched to one or more of the keywords in the keyword group;
  a cost estimate for the keyword group with respect to the advertising position that represents an expected cost associated with having one or more advertisements corresponding to the keyword group selected when displayed in the advertising position in response to a search request matched to one or more of the keywords in the keyword group; or
  a bid-cost delta estimate for the keyword group with respect to the advertising position that represents an expected difference between a bid and a cost for the keyword group with respect to the advertising position, the bid representing an actual bid associated with having one or more advertisements corresponding to the keyword group displayed in the advertising position in response to a search request matched to one or more of the keywords in the keyword group, the cost representing an actual cost associated with having one or more advertisements corresponding to the keyword group selected when displayed in the advertising position in response to a search request matched to one or more of the keywords in the keyword group.

37. The apparatus of claim 22, wherein, for each of the keywords in each of the keyword groups with respect to each of the advertising positions, to calculate the advertising metric estimates for the keyword with respect to the advertising position comprises, based on the sets of metric values of the keywords in the keyword groups and the advertising metric estimates for the keyword groups with respect to the advertising positions, calculate one or more of:
 a click-to-action conversion rate estimate for the keyword with respect to the advertising position that represents an expected number of times one or more actions are performed on one or more web pages that are displayed as a result of one or more advertisements corresponding to the keyword group to which the keyword belongs having been selected when displayed in the advertising position in response to a search request matched to the keyword;
 an impression-to-click rate estimate for the keyword with respect to the advertising position that represents an expected number of times one or more advertisements corresponding to the keyword group to which the keyword belongs are selected when displayed in the advertising position in response to a search request matched to the keyword;
 a bid estimate for the keyword with respect to the advertising position that represents an expected bid associated with having one or more advertisements corresponding to the keyword group to which the keyword belongs displayed in the advertising position in response to a search request matched to the keyword;
 a cost estimate for the keyword with respect to the advertising position that represents an expected cost associated with having one or more advertisements corresponding to the keyword group to which the keyword belongs selected when displayed in the advertising position in response to a search request matched to the keyword; or
 a bid-cost delta estimate for the keyword with respect to the advertising position that represents an expected difference between a bid and a cost for the keyword with respect to the advertising position, the bid representing an actual bid associated with having one or more advertisements corresponding to the keyword group to which the keyword belongs displayed in the advertising position in response to a search request matched to the keyword, the cost representing an actual cost associated with having one or more advertisements corresponding to the keyword group to which the keyword belongs selected when displayed in the advertising position in response to a search request matched to the keyword.

38. The apparatus of claim 37, wherein, for each of the keywords in each of the keyword groups, to generate the bid for the keyword with respect to the target advertising position for the keyword comprises use the bid estimate for the keyword with respect to the target advertising position for the keyword as the bid.

39. The apparatus of claim 22, wherein:
 the advertising positions are organized in a ranked list; and
 for each of the keywords in each of the keyword groups, to select the target advertising position for the keyword comprises:
  for each of the advertising positions, based on the advertising metric estimates for the keyword with respect to the advertising position, calculate a profit estimate for the advertising position that represents a difference between revenue per impression and cost per impression for displaying one or more advertisements in the advertising position in response to one or more search requests matched to the keyword; and
  designate one of the advertising positions that has the greatest profit estimate as the target advertising position for the keyword.

40. The apparatus of claim 22, wherein:
 the advertising positions are organized in a ranked list, and
 for each of the keywords in each of the keyword groups, to select the target advertising position for the keyword comprises:
  select one or more eligible advertising positions from the advertising positions, each of the eligible advertising positions having an estimated return on investment that meets a predetermined threshold requirement by a predetermined probability;
  for each of the eligible advertising positions, based on the advertising metric estimates for the keyword with respect to the eligible advertising position, calculate a profit estimate for the eligible advertising position that represents a difference between revenue per impression and cost per impression for displaying one or more advertisements in the eligible advertising position in response to one or more search requests matched to the keyword; and
  designate one of the eligible advertising positions that has the greatest profit estimate as the target advertising position for the keyword.

41. The apparatus of claim 22, wherein the set of advertising metrics comprises one or more of:
 one or more advertising attributes associated with one or more advertisements and the advertising positions;
 one or more user attributes associated with one or more users; or
 one or more keyword attributes associated with one or more of the keywords.

42. The apparatus of claim 41, wherein the advertising attributes comprises one or more of:
 a first number of times one or more advertisements corresponding to one of the keyword groups are displayed in one of the advertising positions in response to one or more search requests matched to one or more of the keywords in the keyword group;
 a second number of times one or more advertisements corresponding to one of the keyword groups are selected when displayed in one of the advertising positions in response to one or more search requests matched to one or more of the keywords in the keyword group;
 a third number of times one or more actions are performed on one or more web pages that are displayed as a result of one or more advertisements corresponding to one of the keyword groups having been selected when displayed in one of the advertising positions in response to one or more search requests matched to one or more of the keywords in the keyword group;
 a cost associated with having one or more advertisements corresponding to one of the keyword groups selected when displayed in one of the advertising positions in response to one or more search requests matched to one or more of the keywords in the keyword group; or
 a bid associated with having one or more advertisements corresponding to one of the keyword groups displayed in one of the advertising positions in response to one or more search requests matched to one or more of the keywords in the keyword group.

43. One or more computer-readable physical storage media embodying software operable when executed by one or more computer systems to:
   access one or more keyword groups, each of the keyword groups comprising one or more keywords, each of the keywords in each of the keyword groups having one or more sets of metric values determined with respect to a set of advertising metrics and one or more advertising positions;
   for each of the keyword groups with respect to each of the advertising positions, calculate one or more advertising metric estimates for the keyword group with respect to the advertising position based on the sets of metric values of the keywords in the keyword groups;
   for each of the keywords in each of the keyword groups with respect to each of the advertising positions, calculate one or more advertising metric estimates for the keyword with respect to the advertising position based on the sets of metric values of the keywords in the keyword groups and the advertising metric estimates for the keyword groups with respect to the advertising positions; and
   for each of the keywords in each of the keyword groups:
      select one of the advertising positions as a target advertising position for the keyword based on the advertising metric estimates for the keyword with respect to the advertising positions; and
      generate a bid for the keyword with respect to the target advertising position that represents a recommended bid for having one or more advertisements corresponding to the keyword group to which the keyword belongs displayed in the target advertising position in response to one or more search requests matched to the keyword.

44. The media of claim 43, wherein:
   the set of advertising metrics comprises one or more advertising metrics; and
   for each of the keywords in each of the keyword groups:
      each of the sets of metric values uniquely corresponds to a different one of the advertising positions,
      each of the sets of metric values comprises one or more metric values,
      each of the metric values in each of the sets of metric values uniquely corresponds to a different one of the advertising metrics, and
      each of the metric values in each of the sets of metric values is determined for the keyword with respect to the advertising metric corresponding to the metric value and the advertising position corresponding to the set of metric values to which the metric value belongs.

45. The media of claim 44, wherein the software is further operable when executed by the one or more computer systems, for each of the keywords in each of the keyword groups, to:
   determine whether the keyword has sufficient metric data, wherein the sufficiency of the metric data is determined using one or more sufficiency tests based on a quantity of the metric values in the sets of metric values of the keyword satisfying a predetermined threshold requirement; and
   if the keyword has sufficient metric data, then, before generating the bid for the keyword, refine the advertising metric estimates for the keyword based on the sets of metric values of the keyword.

46. The media of claim 45, wherein, for each of the keywords in each of the keyword groups, if the keyword has sufficient metric data, then to refine the advertising metric estimates for the keyword comprises, for each of the advertising metric estimates, if the keyword has sufficient metric data with respect to the advertising metric estimate, then, before generating the bid for the keyword, refine the advertising metric estimate based on the metric values of the keyword.

47. The media of claim 45, wherein the advertising metric estimates for the keywords are refined using one or more statistical models.

48. The media of claim 47, wherein, for each of the keywords, the advertising metric estimates are refined using a penalized generalized linear model using the sets of metric values of the keyword as input parameters to the penalized generalized linear model.

49. The media of claim 48, wherein the penalized generalized linear model comprises a logistic ridge regression model that is solved using a cross-validated gradient descent.

50. The media of claim 43, wherein the advertising metric estimates for the keyword groups and the advertising metric estimates for the keywords are calculated using one or more statistical models.

51. The media of claim 50, wherein, for each of the keyword groups with respect to each of the advertising positions, each of the advertising metric estimates is calculated using a generalized linear model using the sets of metric values of the keywords in the keyword groups as input parameters to the generalized linear model.

52. The media of claim 51, wherein the generalized linear model comprises a logistic regression model, a standard ordinary least squares regression model, a model comprising a Normal random component and a logarithmic link function, or a model comprising a Gamma random component and a logarithmic link function.

53. The media of claim 50, wherein, for each of the keywords in each of the keyword groups with respect to each of the advertising positions, each of the advertising metric estimates is calculated using a penalized generalized linear model using the sets of metric values of the keywords in the keyword groups and the advertising metric estimates for the keyword groups with respect to the advertising positions as input parameters to the penalized generalized linear model.

54. The media of claim 53, wherein the penalized generalized linear model comprises a logistic ridge regression model.

55. The media of claim 54, wherein the logistic ridge regression model is solved using a cross-validated gradient descent.

56. The media of claim 53, wherein a solution of the penalized generalized linear model is approximated using a gradient descent.

57. The media of claim 43, wherein, for each of the keyword groups with respect to each of the advertising positions, to calculate the advertising metric estimates for the keyword group with respect to the advertising position comprises, based on the sets of metric values of the keywords in the keyword groups, calculate one or more of:
   a click-to-action conversion rate estimate for the keyword group with respect to the advertising position that represents an expected number of times one or more actions are performed on one or more web pages that are displayed as a result of one or more advertisements corresponding to the keyword group having been selected when displayed in the advertising position in response to a search request matched to one or more of the keywords in the keyword group;

an impression-to-click rate estimate for the keyword group with respect to the advertising position that represents an expected number of times one or more advertisements corresponding to the keyword group are selected when displayed in the advertising position in response to a search request matched to one or more of the keywords in the keyword group;

a bid estimate for the keyword group with respect to the advertising position that represents an expected bid associated with having one or more advertisements corresponding to the keyword group displayed in the advertising position in response to a search request matched to one or more of the keywords in the keyword group;

a cost estimate for the keyword group with respect to the advertising position that represents an expected cost associated with having one or more advertisements corresponding to the keyword group selected when displayed in the advertising position in response to a search request matched to one or more of the keywords in the keyword group; or a bid-cost delta estimate for the keyword group with respect to the advertising position that represents an expected difference between a bid and a cost for the keyword group with respect to the advertising position, the bid representing an actual bid associated with having one or more advertisements corresponding to the keyword group displayed in the advertising position in response to a search request matched to one or more of the keywords in the keyword group, the cost representing an actual cost associated with having one or more advertisements corresponding to the keyword group selected when displayed in the advertising position in response to a search request matched to one or more of the keywords in the keyword group.

58. The media of claim 43, wherein, for each of the keywords in each of the keyword groups with respect to each of the advertising positions, to calculate the advertising metric estimates for the keyword with respect to the advertising position comprises, based on the sets of metric values of the keywords in the keyword groups and the advertising metric estimates for the keyword groups with respect to the advertising positions, calculate one or more of:

a click-to-action conversion rate estimate for the keyword with respect to the advertising position that represents an expected number of times one or more actions are performed on one or more web pages that are displayed as a result of one or more advertisements corresponding to the keyword group to which the keyword belongs having been selected when displayed in the advertising position in response to a search request matched to the keyword;

an impression-to-click rate estimate for the keyword with respect to the advertising position that represents an expected number of times one or more advertisements corresponding to the keyword group to which the keyword belongs are selected when displayed in the advertising position in response to a search request matched to the keyword;

a bid estimate for the keyword with respect to the advertising position that represents an expected bid associated with having one or more advertisements corresponding to the keyword group to which the keyword belongs displayed in the advertising position in response to a search request matched to the keyword;

a cost estimate for the keyword with respect to the advertising position that represents an expected cost associated with having one or more advertisements corresponding to the keyword group to which the keyword belongs selected when displayed in the advertising position in response to a search request matched to the keyword; or a bid-cost delta estimate for the keyword with respect to the advertising position that represents an expected difference between a bid and a cost for the keyword with respect to the advertising position, the bid representing an actual bid associated with having one or more advertisements corresponding to the keyword group to which the keyword belongs displayed in the advertising position in response to a search request matched to the keyword, the cost representing an actual cost associated with having one or more advertisements corresponding to the keyword group to which the keyword belongs selected when displayed in the advertising position in response to a search request matched to the keyword.

59. The media of claim 58, wherein, for each of the keywords in each of the keyword groups, to generate the bid for the keyword with respect to the target advertising position for the keyword comprises use the bid estimate for the keyword with respect to the target advertising position for the keyword as the bid.

60. The media of claim 43, wherein:
the advertising positions are organized in a ranked list; and
for each of the keywords in each of the keyword groups, to select the target advertising position for the keyword comprises:
for each of the advertising positions, based on the advertising metric estimates for the keyword with respect to the advertising position, calculate a profit estimate for the advertising position that represents a difference between revenue per impression and cost per impression for displaying one or more advertisements in the advertising position in response to one or more search requests matched to the keyword; and
designate one of the advertising positions that has the greatest profit estimate as the target advertising position for the keyword.

61. The media of claim 43, wherein:
the advertising positions are organized in a ranked list, and
for each of the keywords in each of the keyword groups, to select the target advertising position for the keyword comprises:
select one or more eligible advertising positions from the advertising positions, each of the eligible advertising positions having an estimated return on investment that meets a predetermined threshold requirement by a predetermined probability;
for each of the eligible advertising positions, based on the advertising metric estimates for the keyword with respect to the eligible advertising position, calculate a profit estimate for the eligible advertising position that represents a difference between revenue per impression and cost per impression for displaying one or more advertisements in the eligible advertising position in response to one or more search requests matched to the keyword; and
designate one of the eligible advertising positions that has the greatest profit estimate as the target advertising position for the keyword.

62. The media of claim 43, wherein the set of advertising metrics comprises one or more of:
- one or more advertising attributes associated with one or more advertisements and the advertising positions;
- one or more user attributes associated with one or more users; or
- one or more keyword attributes associated with one or more of the keywords.

63. The media of claim 62, wherein the advertising attributes comprises one or more of:
- a first number of times one or more advertisements corresponding to one of the keyword groups are displayed in one of the advertising positions in response to one or more search requests matched to one or more of the keywords in the keyword group;
- a second number of times one or more advertisements corresponding to one of the keyword groups are selected when displayed in one of the advertising positions in response to one or more search requests matched to one or more of the keywords in the keyword group;
- a third number of times one or more actions are performed on one or more web pages that are displayed as a result of one or more advertisements corresponding to one of the keyword groups having been selected when displayed in one of the advertising positions in response to one or more search requests matched to one or more of the keywords in the keyword group;
- a cost associated with having one or more advertisements corresponding to one of the keyword groups selected when displayed in one of the advertising positions in response to one or more search requests matched to one or more of the keywords in the keyword group; or
- a bid associated with having one or more advertisements corresponding to one of the keyword groups displayed in one of the advertising positions in response to one or more search requests matched to one or more of the keywords in the keyword group.

* * * * *